United States Patent [19]
Rohlfing et al.

[11] Patent Number: 4,773,626
[45] Date of Patent: Sep. 27, 1988

[54] ROTARY VALVE

[75] Inventors: Raymond G. Rohlfing; Donald D. Norwood, both of Bartlesville, Okla.

[73] Assignee: Phillips Petroleum Company, Bartlesville, Okla.

[21] Appl. No.: 557,515

[22] Filed: Dec. 2, 1983

[51] Int. Cl.$^4$ ................................................. F16K 5/02
[52] U.S. Cl. ........................................ 251/309; 137/240; 222/219
[58] Field of Search .................... 137/240, 375, 614.17; 251/211, 309, 314; 222/219, 249

[56] References Cited

U.S. PATENT DOCUMENTS

| | | | |
|---|---|---|---|
| 1,049,478 | 1/1913 | Hedgecock | 222/219 |
| 2,278,819 | 4/1942 | Gredell | 299/34 |
| 2,880,820 | 4/1959 | Focht et al. | 137/614.17 X |
| 3,026,894 | 3/1962 | Brooks | 137/240 |
| 3,066,909 | 12/1962 | Reed, Jr. | 251/309 |
| 3,125,136 | 3/1964 | Miller et al. | 141/369 |
| 3,139,996 | 7/1964 | Welty | 214/17 |
| 3,167,398 | 1/1965 | Whittington | 23/285 |
| 3,208,644 | 9/1965 | Bergson | 222/249 |
| 3,219,208 | 11/1965 | Hadley et al. | 214/17 |
| 3,323,687 | 6/1967 | Thornhill | 222/219 |
| 3,387,748 | 6/1968 | Brenchley | 222/70 |
| 3,522,820 | 8/1970 | Watts et al. | 251/309 X |
| 3,528,447 | 9/1970 | Kolb | 137/240 |
| 3,559,678 | 2/1971 | Donner | 137/535 |
| 3,665,957 | 5/1972 | Fulmer et al. | 137/509 |
| 3,815,870 | 6/1974 | Milleville et al. | 251/309 |
| 3,916,943 | 11/1975 | Hester et al. | 137/375 |
| 3,985,150 | 10/1976 | Kindersley | 137/240 |
| 4,111,229 | 9/1978 | Christian | 137/614.17 |
| 4,325,837 | 4/1982 | Capshew et al. | 252/429 B |
| 4,413,646 | 11/1983 | Platt et al. | 137/375 X |

OTHER PUBLICATIONS

Operating and Maintenance Instructions AP-150 Double Check Feeder Valve, Seismograph Service Corporation, Seiscor Division, Feb., 1976.

*Primary Examiner*—A. Michael Chambers
*Assistant Examiner*—John C. Fox
*Attorney, Agent, or Firm*—Williams, Phillips & Umphlett

[57] ABSTRACT

A valve structure including a valve body defining a valve chamber, a pair of annular inlet and outlet seal members, and a tapered valve member journaled in corresponding tapered sealing surfaces in the inlet and outlet seal member. Passages communicate respectively between a fluid source and the inlet passage, the outlet passage and the valve chamber. The maximum diametral dimensions of the valve passage through the valve member at its point of communication with the tapered surface of the valve member is less than the minimum width of the sealing surfaces of the seal members along the path traced by the valve passage as the valve member is rotated. A method of controlling passage of material through such a valve structure is also disclosed.

18 Claims, No Drawings

ROTARY VALVE

The present invention relates generally to apparatus for controlling the flow of material. In one aspect the invention relates to an improved valve for controlling the flow of material therethrough. In another aspect the invention relates to apparatus suitable for use as a feeder for controlling the flow of material therethrough. A more specific aspect of the invention relates to the feeding of particulate catalyst to a catalytic reactor system.

The apparatus of the present invention is an improvement over the valve or feeder mechanisms disclosed in U.S. Pat. Nos. 3,219,208 and 3,139,996. Particulate catalyst, uch as chromium oxide deposited on silica or silica-alumina, is relatively abrasive, and it has been found that feeder mechanisms for such catalyst are subject to undesirable wear between the rotary valve plug or rotor and the valve body in which the valve plug or rotor is carried. Such wear can cause both leakage of catalyst into the valve chamber through spaces worn between the valve plug or rotor and the valve body and increased operating torque required to rotate the valve plug or rotor relative to the valve body.

The present invention contemplates a valve for controlling the passage of material therethrough. The valve comprises a valve body defining a valve chamber and having an inlet port and an outlet port, with each of the ports communicating between the valve chamber and the exterior of the valve body. An annular inlet seal is mounted in the valve chamber and has an inlet passage therethrough communicating in sealing engagement with the inlet port. In a similar manner, an annular outlet seal is mounted in the valve chamber and has an outlet passage therethrough communicating in sealing engagement with the outlet port. A valve member, having a frustoconically shaped outer surface having a longitudinal axis and first and second opposite ends with a transverse passage extending through the longitudinal axis, is disposed within the valve chamber and is closely received between the inlet and outlet seals with its frustoconically shaped outer surface in slidable sealing engagement with respective corresponding frustoconically shaped sealing surfaces of the inlet and outlet seals. The valve member is adapted to rotate about its longitudinal axis within the valve chamber. The maximum diameter of the transverse passage at its communication with the frustoconically shaped outer surface of the valve member is less than the minimum width of the frustoconically shaped sealing surfaces across which the transverse passage is revolved during rotation of the valve member about its longitudinal axis. The valve is further provided with means for drivingly securing the valve member to drive means for rotating the valve member about its longitudinal axis within the valve chamber. Biasing means are provided for urging the frustoconically shaped outer surface of the valve member into slidable sealing engagement with the respective corresponding frustoconically shaped sealing surfaces of the inlet and outlet seals. The valve additionally includes a passage communicating between the exterior of the valve body and the inlet port upstream of the inlet seal, as well as means in fluid flow communication between the passage and a source of fluid whereby fluid from the source flows through the passage into the inlet port so as to flush the material downstream through the valve.

The present invention further contemplates a method of controlling the passage of material through a structure of the general type described above which includes introducing fluid transversely into the inlet port at a point upstream of the annular inlet seal, supplying material to the inlet port upstream of the point of introduction of the fluid, and rotating the valve member relative to the valve body to block flow of material and introduced fluid through the valve body from the inlet port, and, alternately, to permit flow of material and introduce fluid into the valve body via the inlet port and out of the valve body via the outlet port.

Accordingly, it is an object of the present invention to provide apparatus which overcomes the deficiencies of previous feeder mechanisms.

Another object of the invention is to provide a valve structure which overcomes the problem of material leakage between the valve member and the valve body.

Yet another object of the invention is to provide a valve structure suitable for controlling the feeding of particulate material.

Still another object of the invention is to provide a valve structure wherein torque required to rotate the valve member relative to the valve body is minimized.

Another object of the invention is to provide a valve structure suitable for controlling the feeding of abrasive particulate material which minimizes abrasive wear between the valve member and sealing surfaces carried by the valve body.

Yet another object of the invention is to provide a valve structure which is simple and economical in construction and in operation.

A further object of the invention is to provide a method of controlling the flow of material, such as, for example, particulate catalyst, through a feeder mechanism which is simple, economical and reliable in operation.

Other objects, aspects and advantages of the invention will be evident from the following detailed description when read in conjunction with the accompanying drawings in which:

FIG. 1 is a vertical cross-sectional view taken along the longitudinal center line of a feeder valve structure constructed in accordance with the present invention; and FIG. 2 is a horizontal cross-sectional view taken along line 2—2 of FIG. 1.

Referring now to the drawings, apparatus for controlling the flow of material therethrough constructed in accordance with the present invention is illustrated therein and is generally designated by the reference character 10. The apparatus 10 comprises a valve body assembly 12, a valve member assembly 14, an annular inlet seal 16 and an annular outlet seal 18.

The valve body assembly 12 comprises a valve body member 20 having an inlet port 22, an outlet port 24 which communicate with a valve chamber 26 in the medial portion of the valve body member 20. The inlet and outlet ports 22 and 24 are coaxially aligned. The valve chamber 26 is provided with an annular recess 28 formed in the inner surface thereof coaxial with the inlet port 22, and is further provided with an annular recess 30 formed in the inner surface thereof coaxial with the outlet port 24 in which the annular inlet seal 16 and annular outlet seal 18 are respectively sealingly received.

The top of the valve chamber 26 is closed by a removable cap 32 which is secured to the valve body member 20 by suitable means such as a plurality of threaded cap screws 34. A fluid-tight seal is achieved between the cap 32 and the valve body member 20 by means of a gasket or seal 36. An opening 38 is provided in the cap 32 through which the valve stem 40 of the valve member assembly 14 extends. A suitable seal is provided between the valve stem 40 and the opening 38 by means of a suitable packing assembly 42 which is received in a corresponding annular recess 44 formed in the inner surface of the cap 32 coaxial with the opening 38. The packing assembly 42 may suitably comprise a plurality of chevron-type annular packing elements formed of a suitable material such as, for example, Teflon.

The valve body assembly 12 further includes a tubular insert 46 fixedly secured within the inlet port 22. The tubular insert 46 provides a converging, frustoconically shaped transition within the inlet port 22 to a diameter substantially equal to the diameter of the inlet passage 48 of the annular inlet seal 16. The tubular insert 46 can be made of any suitable material which will hold up in service to any abrasive action of the material which is to be passed through the apparatus 10. Suitable materials include synthetic polymeric materials such as polymers and copolymers comprising the monomer ethylene, with ultrahigh molecular weight polyethylene being a presently preferred material for the tubular insert 46.

A passage 50 communicates between the exterior of the valve body member 20 and the interior of the inlet port 22 and tubular insert 46. The passage 50 is preferably provided with an internally threaded fitting 52 on the exterior of the valve body member 20 which provides means for connecting the passage 50 in fluid flow communication with a source of fluid (not shown).

A passage 54 communicates between the exterior of the valve body member 20 and the valve chamber 26 intermediate the annular inlet and outlet seals 16 and 18. The passage 54 is also preferably provided with an internally threaded fitting 56 which provides means for connecting the passage 54 in fluid flow communication with a source of fluid (not shown).

The valve body assembly 12 further includes an outlet flange 58 to which is bolted a flanged extension 60 by means of a plurality of threaded bolts 62. The flanged extension 60 is provided with a central opening 64 which is coaxial with and provides an extension to the outlet port 24. The central opening 64 converges downstream from the outlet port 24 and preferably terminates in an internally threaded portion 66 which provides convenient means for connecting the outlet end of the apparatus 10 to a suitable conduit for removal of material passed through the apparatus. A passage 68 communicates between the exterior of the flanged extension 60 of the valve body assembly 12 and the interior of the central opening 64 which, as noted above, provides an extension of the outlet port 24. The passage 68 communicates with an internally threaded fitting 70 which provides means for connecting the passage 68 in fluid flow communication with a source of fluid (not shown).

The valve member assembly 14 is further characterized to include a rotor 72 of truncated conical shape to which the previously mentioned valve stem 40 is drivingly secured. The rotor 72 of the valve member assembly 14 has a frustoconically shaped, tapered outer surface 74 having a longitudinal axis coaxial with the axis of the valve stem 40 with first and second opposite ends 76 and 78. The rotor 72 of the valve member assembly 14 is disposed within the valve chamber 26 and the outer surface 74 thereof is closely received between respective corresponding frustoconically shaped sealing surfaces 80 and 82 of the annular inlet and outlet seals 16 and 18. Sealing contact is maintained between the outer surface 74 and the sealing surfaces 80 and 82 by means of a plurality of belleville washers 84 disposed about the valve stem 40 intermediate the packing assembly 42 and the first end 76 of the rotor 72. The belleville washers 84 maintain a fluid tight seal between the valve stem 40 and the removable cap 32 by maintaining a constant compressive force on the packing assembly 42 in the annular recess 44. The seals 16 and 18 can be made of any suitable material which will provide the desired sliding seal with the outer surface 74 of the rotor 72 and the desired service life when handling the materials being controlled by the apparatus 10. Such materials include synthetic polymeric materials, with glass reinforced Teflon being a presently preferred material for handling abrasive materials.

A transverse passage 86 extends through the longitudinal axis of rotation of the rotor 72 of the valve member assembly 14. The passage 86 is preferably circular in cross section and carries a piston element 88 slidably disposed therein. The piston element 88 is preferably a sphere and is retained within the transverse passage 86 by means of radially inwardly extending annular shoulders or seats 90 and 92. The maximum diametral dimension of the transverse passage 86 at each of its intersections with the outer surface 74 of the rotor 72 is less than the minimum width of the sealing surface 80 of the annular inlet seal 16 between the inlet passage 48 and the outer periphery thereof along the circumferential path traced by the intersections of the transverse passage 86 when revolved by rotation of the rotor 72. In a similar manner, the maximum diametral dimension of the transverse passage 86 at each of its intersections with the outer surface 74 of the rotor 72 is less than the minimum width of the sealing surface 82 of the annular outlet seal 18 between the outlet passage 94 and the outer periphery thereof along the circumferential path traced by the intersections of the transverse passage 86 as it is revolved by the rotating rotor 72. This relationship between the maximum diametral dimensions of the transverse passage 86 at its points or lines of communication with the outer surface 74 of the rotor 72 and the width of the sealing surfaces 80 and 82 prevents the discharge of any materials carried within the transverse passage 86 into the valve chamber 26 during rotation of the rotor 72 as a result of any differential pressure between the interior of the inlet port 22 and the cavity 26.

As illustrated in FIG. 1, the transverse passage 86 is preferably defined by a pair of generally cylindrically shaped inserts 96 and 98 which are fixedly secured by suitable means within a transverse bore 100 extending through the longitudinal axis of rotation of the rotor 72. The use of interchangeable inserts 96 and 98 defining various diameters of the transverse passage 86 provides means for varying the capacity within the transverse passage 86 for metering a precise quantity of material being passed through the apparatus 10 upon each half rotation of the rotor 72.

The outer end of the valve stem 40 is preferably provided with a pair of wrench flats 102 or other suitable means for drivingly connecting the valve stem 40 to suitable drive means for rotating the valve member assembly 14 within the valve body assembly 12.

In operation, the apparatus 10 can be advantageously employed in a system for automatically feeding precisely controlled amounts of particulate catalyst to a continuous catalytic reaction. Such a process employing automatic catalyst feeding is disclosed in U.S. Pat. No. 3,219,208, the disclosure of which is incorporated herein by reference. During such operation of the apparatus 10, a suitable lubricating fluid is provided from a suitable fluid source (not shown) at a suitable pressure to the valve chamber 26 of the valve body assembly 12 via fitting 56 and passage 54. Such lubricating fluid is provided at a pressure sufficient to overcome the working pressure applied to the valve member assembly 14 so that the lubricating fluid provides lubricating action between the valve rotor 72 and the sealing surfaces 80 and 82 of the annular inlet and outlet seals 16 and 18. In a similar manner, suitable fluids are also introduced from one or more suitable fluid sources (not shown) at suitable pressures generally transversely into the inlet port 22 via fitting 52 and passage 50 as well as into the outlet port 24 and extension thereof defined by the central opening 64 via fitting 70 and passage 68. Suitable lubricating fluids as well as the flushing fluids applied to the inlet and outlet ports 22 and 24 include, but are not limited to, hydrocarbons employed in the polymerization process, e.g., isobutane, isopentane, cyclohexane or mixtures of any two or more thereof, or a non-poisonous lubricating oil, e.g., pump seal mineral oil, to both prevent catalyst entry into the valve chamber 26 and to reduce friction and abrasive wear between the valve rotor 72 and annular inlet and outlet seals 16 and 18, and to additionally facilitate the flow of catalyst thzough the inlet and outlet ports 22 and 24 of the apparatus 10. The utilization of such suitable fluids substantially reduces the required valve operating torque and greatly prolongs the operating life of the apparatus 10.

While the apparatus 10 is advantageously employable for the automatic control of the feeding of catalyst to a catalytic reaction, it will be understood that the apparatus structure herein disclosed can also be advantageously employed in the construction of tapered plug valves used in other applications. A significant advantage provided by the apparatus 10 is its capacity to maintain a constant, low-friction sliding sealing engagement between the tapered valve plug or rotor and the corresponding tapered sealing surfaces 80 and 82 of the annular inlet and outlet seals 16 and 18 which is extremely advantageous in the handling of both liquids and particulate solids, especially when such liquids or particulate solids are particularly abrasive.

From the foregoing detailed description of the apparatus of the present invention, it will be seen that the apparatus effectively overcomes the deficiencies of similar prior devices and provides significant advantages thereover. It will be further understood that the present invention can be advantageously employed in feeding the catalysts disclosed in U.S. Pat. No. 4,325,837, the disclosure of which is incorporated herein by reference. Changes may be made in the combination and arrangement of parts or elements as heretofore set forth in the specification and shown in the drawings without departing from the spirit and scope of the invention as defined in the following claims.

We claim:

1. A valve for controlling the passage of material therethrough, comprising:

valve body means defining a valve chamber and having an inlet port and an outlet port, each of said ports communicating between said valve chamber and the exterior of said valve body means;

annular inlet seal means mounted in said valve chamber and having an inlet passage therethrough communicating in sealing engagement with said inlet port;

annular outlet seal means mounted in said valve chamber and having an outlet passage therethrough communicating in sealing engagement with said outlet port;

valve member means for controlling the passage of material through said valve body means, said valve member means having a frustoconically shaped outer surface having a longitudinal axis and first and second opposite ends with a transverse passage extending through said logitudinal axis and intersecting said frustoconically shaped outer surface, said transverse passage having a maximum diametral dimension at its intersections with the frustoconically shaped outer surface of said valve member means, said valve member means being disposed within said valve chamber and being closely received between said inlet and outlet seal means with its frustoconically shaped outer surface in slidable sealing engagement with respective corresponding frustoconically shaped sealing surfaces of said inlet and outlet seal means, said valve member means being adapted to rotate about its longitudinal axis within said valve chamber, the maximum diametral dimension of said transverse passage at its intersections with the frustoconically shaped outer surface of said valve member means being less than the minimum width of the frustoconically shaped sealing surfaces of said inlet and outlet seal means across which the intersections of said transverse passage are revolved during rotation of said valve member means about its longitudinal axis;

means for drivingly securing said valve member means to drive means for rotating said valve member means about its longitudinal axis within said valve chamber;

means operatively related to said valve member means for maintaining the frustoconically shaped outer surface of said valve member means in slidable sealing engagement with the respective corresponding frustoconically shaped sealing surfaces of said inlet seal means and said outlet seal means;

first passage means communication between said inlet port upstream of said inlet seal means and the exterior of said valve body means; and means in fluid flow communication between said first passage means and a source of fluid whereby fluid from said source flows through said first passage means into said inlet port so as to flush said material downstream through said valve.

2. A valve in accordance with claim 1 characterized further to include:

second passage means communicating between said valve chamber and the exterior of said valve body means; and means in fluid flow communication between said second passage means and a source of fluid whereby fluid from said source flows through said second passage means into said valve chamber so as to prevent entrance of said material into said valve chamber.

3. A valve in accordance with claim 1 characterized further to include:

third passage means communicating between the exterior of said valve body means and said outlet port downstream of said outlet seal means; and means in fluid flow communication between said third passage means and a source of fluid whereby fluid from said source flows through said third passage means to said outlet port so as to flush said material downstream from said valve.

4. A valve in accordance with claim 1 characterized further to include:
   piston means disposed within the transverse passage through said valve member means for longitudinal movement within the transverse passage; and
   means located within each end of the transverse passage for retaining said piston means within said transverse passage and limiting the longitudinal movement of said piston means within the transverse passage.

5. A valve in accordance with claim 1 characterized further to include:
   a tubular insert disposed within said inlet port, said insert defining a passageway which converges in the downstream direction to a cross-sectional area substantially equal to the cross-sectional area of the inlet passage of said annular inlet seal means.

6. A valve in accordance with claim 5 wherein said passageway in said insert is generally frustoconically shaped.

7. A valve in accordance with claim 5 wherein said tubular insert is constructed of a synthetic polymeric material.

8. A valve in accordance with claim 1 wherein at least a portion of the inner surface of said inlet port is formed of a synthetic polymeric material.

9. Apparatus suitable for use as a feeder for controlling the flow of material therethrough, comprising:
   a shaft having on one end thereof a coaxial truncated conical rotor having opposite ends and a frustoconical outer surface, and at least one cavity in said rotor intermediate its ends for receiving and delivering material fed thereto, said cavity having a maximum diametral dimension at its communication with the frustoconical outer surface of said rotor;
   a housing around said rotor and at least a portion of said shaft;
   a material inlet through said housing leading to a path described by said cavity when revolving with said rotor;
   a material outlet through said housing leading from said path and spaced circumferentially from said material inlet;
   inlet seal means carried by said housing between said material inlet and said rotor and having an inlet passage therein communicating between said material inlet and the path of said cavity when revolving for providing annular sealing engagement with said material inlet and sealing engagement along an annular slidable sealing surface with said rotor across the path of said cavity when revolving, said annular slidable sealing surface having a width across the path of said cavity when revolving greater than the maximum diametral dimension of said cavity at its communication with the frustoconical outer surface of said rotor;
   outlet seal means carried by said housing between said material outlet and said rotor and having an outlet passage therein communicating between said material outlet and the path of said cavity when revolving for providing annular sealing engagement with said material outlet and sealing engagement along an annular slidable sealing surface with said rotor across the path of said cavity when revolving, said annular slidable sealing surface having a width across the path of said cavity when revolving greater than the maximum diametral dimension of said cavity at its communication with the frustoconical outer surface of said rotor;
   first passage means communicating between the exterior of said housing and said material inlet upstream of said inlet seal means; and
   means in fluid flow communication between said first passage means and a first source of fluid whereby fluid from said first source flows through said first passage means into said material inlet so as to flush material therein downstream through said apparatus.

10. Apparatus in accordance with claim 9 characterized further to include:
    second passage means communicating between the exterior of said housing and the interior of said housing intermediate said inlet seal means and said outlet seal means; and
    means in fluid flow communication between said second passage means and a second source of fluid whereby fluid from said second source flows through said second passage means into said housing so as to prevent entrance of said material into said valve body intermediate the inlet seal means and the outlet seal means, and wherein said first source of fluid and said second source of fluid can be the same or different.

11. Apparatus in accordance with claim 10 characterized further to include:
    third passage means communicating between the exterior of said housing and said material outlet downstream of said outlet seal means; and
    means in fluid flow communication between said third passage means and a source of fluid whereby fluid from said source flows through said third passage means to said material outlet so as to flush material therein downstream from said apparatus.

12. Apparatus in accordance with claim 9 wherein at least a portion of the inner surface of said material inlet is constructed of a synthetic polymeric material.

13. Apparatus in accordance with claim 9 characterized further to include a tubular insert disposed in said material inlet, said insert defining a passageway having a cross-sectional area adjacent said inlet seal means substantially equal to the cross-sectional area of the inlet passage of said inlet seal means.

14. Apparatus in accordance with claim 13 wherein the passageway in said insert converges toward said inlet seal means.

15. Apparatus in accordance with claim 13 wherein the passageway in said insert is generally frustoconically shaped.

16. Apparatus in accordance with claim 13 wherein said insert is constructed of a synthetic polymeric material.

17. Apparatus in accordance with claim 16 wherein said polymeric material is a polymer or a copolymer comprising ethylene monomer.

18. Apparatus in accordance with claim 17 wherein said polymeric material is ultra-high molecular weight polyethylene.

* * * * *